United States Patent [19]
Kot et al.

[11] Patent Number: 5,323,828
[45] Date of Patent: Jun. 28, 1994

[54] REINFORCED COMPOSITE STRUCTURE

[75] Inventors: Kenneth M. Kot; Byung-Lip Lee, both of Akron, Ohio

[73] Assignee: The Goodyear Tire & Rubber Company, Akron, Ohio

[21] Appl. No.: 133,169

[22] Filed: Dec. 11, 1987

Related U.S. Application Data

[63] Continuation of Ser. No. 836,934, Mar. 6, 1986, abandoned.

[51] Int. Cl.$^5$ .............................................. B60C 9/00
[52] U.S. Cl. ..................................... 152/451; 152/527
[58] Field of Search ........................ 57/902, 200, 236; 428/10.5; 152/450, 451, 526, 527, 548, 556, 559

[56] References Cited

U.S. PATENT DOCUMENTS

| | | |
|---|---|---|
| 1,903,925 | 12/1930 | Johnson . |
| 2,022,839 | 12/1932 | Austin . |
| 2,353,432 | 5/1942 | Arrington . |
| 2,746,135 | 5/1956 | Harris . |
| 3,575,228 | 4/1971 | Marzocchi . |
| 3,805,508 | 4/1974 | Maderna . |
| 3,984,238 | 10/1976 | Vlasov . |
| 4,011,899 | 3/1977 | Chamberlin . |
| 4,020,887 | 5/1977 | Vlasov . |
| 4,119,748 | 10/1978 | Verbauwhede . |
| 4,224,377 | 9/1980 | Moens . |
| 4,258,543 | 3/1981 | Canevari . |
| 4,349,063 | 9/1982 | Kikuchi . |
| 4,566,261 | 1/1986 | Brandyberry . |
| 4,606,392 | 8/1986 | Weiderhoupt et al. . |
| 4,749,017 | 6/1988 | Loesch . |

FOREIGN PATENT DOCUMENTS

| | | |
|---|---|---|
| 42171 | 7/1972 | Australia . |
| 20904 | 11/1983 | Australia . |
| 2090483 | 11/1983 | Australia . |
| 24052 | 1/1986 | Australia . |
| 0144811 | 11/1984 | European Pat. Off. . |
| 0225055 | 10/1986 | European Pat. Off. . |
| 56779 | 5/1981 | Fed. Rep. of Germany . |
| 1042293 | 1/1980 | Italy . |
| 4895310 | 12/1973 | Japan . |
| 5214778 | 4/1977 | Japan . |
| 53030505 | 3/1978 | Japan . |
| 5335059 | 4/1978 | Japan . |
| 5450640 | 4/1979 | Japan . |
| 565294 | 2/1981 | Japan . |
| 56-103093 | 8/1981 | Japan . |
| 5751502 | 3/1982 | Japan . |
| 57-155103 | 9/1982 | Japan . |
| 58-194604 | 11/1983 | Japan . |
| 2098251A | 5/1982 | United Kingdom . |

OTHER PUBLICATIONS

Patent Abst. of Japan, vol. 7, No. 153 (M-226) [1298] Jul. 5, 1983; & JP-A5861006 (Bridgestone Tire K.K.) Nov. 4, 1983.
Research Disclosure 17015, Jun., 1978.
Research Disclosure 18441, Aug., 1979.
Rubber and Plastics News, Jun. 18, 1984, "Changes loom in tire reinforcement", pp. 1, 21–24.
Sodetal, DC-25b, Aug. 1978 (FIG. II, 2×0).
Research Disclosure 15955; p. 53; Jul., 1977.
Chemical Engineering Progress, "Tire Cord Materials for the Belted Bias Tire", B. L. Rodenkirch, vol. 9, Apr., 1973.
New Construction, Apr. 1982 (Presentation).
Evolution High Tensile Cord, Mar. 21, 1984 (Presentation).
Survey Applications of High Tensile Cords, Feb. 18, 1983 (Presentation).
Comparison of Cord Construction in the Rubber Composite, May 1985 (Presentation).
Enka Steel Cord Presentation, 1985 (Presentation).

(List continued on next page.)

Primary Examiner—James J. Bell
Attorney, Agent, or Firm—T. P. Lewandowski

[57] ABSTRACT

One or more plies of reinforced elastomer, particularly two plies (10),(12) of rubber reinforced with twisted filament metallic cords (14) and more particularly a tire belt made up of the two plies (10),(12) is disclosed having cords (14) of 2×0.30 HT construction with opposed 23° angles to the direction of reinforcement of the belt.

11 Claims, 1 Drawing Sheet

OTHER PUBLICATIONS

American Chemical Society Abstracts and Patent Excerpts on the Carbon Composition of Steel Wire Belts: Elongated Bodies of High Strength Carbon Steel.
Manufacturing a Steel Strip by Rolling, and the Produced Strip.
Steel Cords for Reinforcing Rubber Tires.
More on Steel Tires.
Steel for Tire Cord Wire.
Adhesive-Coated Steel Reinforcement with High Strength Corded Steel Wire.
Steel Member for Reinforcing Rubber Composites.
Steel for Metal Cord.
Manufacturing and Quality Control in the Production of Steel and Wire Rod for Tire Cord.
Cast Steel Fibers for Reinforcing Tires.
Japan 53076917.
Japan 52082621.
U.S. 4,023,989.
U.S. 4,017,338.
U.S. 4,011,899.
Belgium 838671.
Germany 2155377.
Germany 2533719.
U.S. 4,142,920.
U.S. 4,142,919.
U.S. 4,106,957.
U.S. 4,104,445.
U.S. 4,029,832.
U.S. 3,953,250.
References received from N. V. Bekaert:
Great Britain 1,017,073—Steel Cords Ltd.
Kelley, New Tyre Constructions Today and Tomorrow, Excerpts from the Speech by John D. Kelley, Tyres & Accessories, Jun., 1984, 78–79.
D. Given, Radial Tire Technology Continues its Evolution, The Technomart, Rubber World, Jun. 1984, 51–52.
Veith Pirelli Ag., What is Expected of the Steel Belt in a Car Tyre?, Wire Industry, May 1981, 339.
Yoshimuchi et al, Inclusion Controlled Wire Rods for Steel Tire Cord Applications, Wire Journal International, 224–232.
Nakamura et al, The Influence of Phosphorus and Sulfur Contents on the Plastic Deformability of High Carbon Steel Wire, Wire Journal, Sep., 1978, 110–113.
Europe 0110597 Bridgestone.
Italy 1042293 Jan. 30, 1980 Pirelli S.p.A., Milan.
Hungary Muanyag es Gumi Mar. 1984.
Research Disclosure 18551, Aug., 1979.

REINFORCED COMPOSITE STRUCTURE

This is a continuation of application Ser. No. 836,934 filed Mar. 6, 1986 now abandoned.

The present application relates to a composite laminate structure of cord reinforced elastomer and more particularly to a cord reinforced composite having rubber where preferably the cord is metallic. Even more particularly, the structure is for tires and preferably a tire belt wherein at least one of two plies in the belt has the cords therein biased with respect to the direction of rotation of the tire.

Reinforced elastomeric articles are well known in the art for example for conveyor or like type belts, tires etc., with cords of textile and/or fine steel wire, particularly belts for pneumatic tires with up to four plies with the cord reinforcement between adjacent plies being opposingly biased with respect to the direction of movement of the tire where it is desired to reinforce in the lateral direction in addition to the direction of rotation of the tire. Further, cords made of multi twisted filaments of fine wire with two or more filaments in a single strand construction having a wrap filament therearound to reinforce the above structure have also long been known. More recently multi strand cords such as 2+7×0.22+1 have been found necessary to meet the higher demand of fatigue life for composites in tire belts but are more expensive to make. Most recently, there has been use of single strand cords of multi filaments which are not twisted about each other but rather twisted altogether as a bundle or bunch to simplify the cord construction. Higher fatigue life requirements for composites in tires have resulted in cords with smaller filament diameter requiring more filaments in the cord to obtain the necessary strength.

Many problems have arisen particularly with respect to bonding a ply with an opposing angle of reinforcement to an adjacent ply to form a composite laminate. For example when the above composite laminate has a flexible rubber matrix as in a tire belt and is loaded by a uniform tensile stress resulting from both tire inflation and footprint load, the oppositely directed in-plane shear stresses in each ply result in a large strain gradiant near each edge of the laminate as indicated in FIG. 1. Consequently under tension the cord rubber composite belt is highly susceptible to initiation of interply shear fracture near the edge of the belt which is known as belt edge separation. Under both static and cyclic loading, the belt edge separation is initiated by cracking around the individual cord ends at the cord-rubber interface of the plies. The load for initiation of belt edge separation constitutes a threshold level for semi-infinite fatigue life of cord-rubber composites. When the maximum stress during cyclic loading does not exceed the initiating load for belt edge separation, the cord rubber composites exhibit no damage and therefore virtually infinite fatigue life. The load at which the composite fails in delamination measures the load, referred to below as gross load, carrying capability of the composite structure which is dependent upon three factors assuming adequate cord to rubber adhesion. The factors are cord modulus, the ratio of cord volume to rubber volume which is often expressed as the number of cord ends per inch, and the angle of cord reinforcement. As the angle of cord reinforcement approaches the direction of rotation of the tire the support from the reinforcement in the lateral direction moves toward zero. An increase in the above-mentioned two other cord related factors generally results in an increase of weight for the belt. Added weight means added cost and higher rolling resistance of a tire. Lighter cords with a lower modulus do not solve the problem because even though they have lower weight they also have a lower cord modulus which must be offset by increasing the ratio of cord to rubber volume. This increase in cord volume is limited by the physical size of the cord and the resulting spacing between the cords which governs the ability of the rubber to penetrate between the cords for good cord to rubber adhesion.

As indicated below the present invention will be shown to have substantially improved the critical load for preventing belt edge separation without decrease of the load carrying capability of the overall tire belt over conventional belt constructions typically reinforced by 2+2×0.25 and 2+7×0.22+1 cord constructions.

A reinforced composite structure according to the present invention is preferably a reinforced ply of elastomer for tire belts having two layers of cord, each cord made of two single 0.30 mm diameter filaments, said filaments made from steel with a carbon content by weight of 0.82%, each layer having 9.45 cords per centimeter laterally spaced in a direction lateral to the direction of the width of the tire at angles of 23° to the direction of movement of the tire and opposed to each other. Also included is a reinforced ply of elastomer for tires having a cord of two twisted filaments, each filament of less than 0.34 mm diameter made from steel with a carbon content by weight of 0.7 to 0.9%, said ply having at least 8.66 cords per centimeter spaced in a direction lateral to the direction of reinforcement of the ply. Further, the reinforced composite structure can comprise an elastomeric body, a plurality of individual twisted filament reinforcing cords of a diameter from 0.25 to 0.68 mm, the cords being laterally spaced at 8.66 to 11.02 cords per centimeter in the body and the body having a modulus greater than 120 MPa psi.

A composite envisioned as an invention hereof can be an elastomer body, a plurality of individual, twisted filament reinforcing cords, the cords having a Tabor stiffness of less than 60 grams, the ply having a critical load separation greater than 19.8 MPa with critical strain not exceeding 11.0%. Also envisioned is an elastomeric body, a plurality of individual, twisted filament reinforcing cords, the cords having a Tabor stiffness of less than 60 grams, and a modulus greater than 190 GPa and a filament diameter of less than 0.34 mm. Finally, a composite according to the present invention is envisioned as an elastomeric body, a plurality of individual, twisted filament reinforcing cords, the cord filaments having a diameter of less than 0.34 mm and a cord modulus greater than 190 GPa, the ply having a fatigue life to withstand no damage at 2,000,000 cycles when loaded up to 16.9 MPa and cycled at 10 cycles per second.

The above composites have the advantages of a 20% increase in critical load over a comparable composite reinforced with 2+2×0.25 cord. A smaller diameter of the cord of the reinforcement of the present invention results in less rubber gauge being used where a comparable thickness of rubber is laid on each side of the reinforcing cord upon calendering. Where two filament cord is used the result is an open cord having no core resulting in better rubber penetration. The two filament cord results in a cost savings over cords of three filaments or more in the manufacture of the cord. A smaller diameter cord results in less weight in the reinforcement resulting in lower rolling resistance for a tire thereby reinforced. A tire belt reinforced with a two filament cord having filament diameters of 0.30 mm results in 1 to 2% better rolling resistance compared to the same system reinforced with 2+2×0.25 cord. Similarly, the above two filament cord results in a 15% or better plunger energy for tires over 2+2×0.25 cord for comparable reinforcements. Use of a two filament cord having filament diameters of 0.30 mm and made of high tensile steel results in a 16% increase in the composite modulus without effecting the composite strain which remains the same in comparison to 2+2×0.25 conventional steel cord at 7.87 ends per centimeter where the end count for the two filament cord is increased to 9.45 ends per centimeter. Finally, the above two filament cord results in a 2 to 6% greater composite stiffness over 2+2×0.25 cord reinforced composites in tire belts even though the diameter of the two filament cord is smaller and its weight has been reduced over 2+2×0.25 cord.

The above advantages of the invention will become readily apparent to one skilled in the art from reading the following detailed description of an embodiment of the invention when considered in the light of the accompanying drawings in which

BRIEF DESCRIPTION OF THE DRAWING

Referring to FIGS. 1 and 2 of the drawings a single ply is illustrated in an unloaded condition, shown dotted, and in a loaded condition under tension indicated by the arrows F. This ply is shown in FIG. 2 within a pneumatic tire with a radial carcass and a second ply 12 forming the belt package for the tire. Both plies are reinforced with cords 14 spaced laterally to the direction of reinforcement indicated by arrows F and preferably at an angle of 23° but with the cord angles of the two plies 10 and 12 opposing each other. Angles of 18° to 28° for reinforcing cords are found useful.

Figure 2:
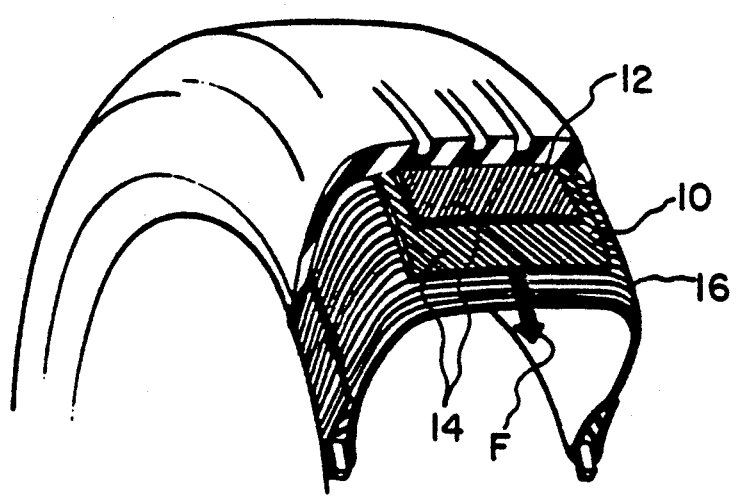
FIG. 2 illustrates a perspective of a portion of a tire having parts cut away to illustrate a belt package having composite structures according to the present invention.

The cords are surrounded by an elastomer preferably rubber and the cord-rubber composite structure forms the plies 10 and 12. The plies 10 and 12 in turn form a laminate structure such as the belt reinforcement for the tire illustrated in FIG. 2. It will be appreciated that other laminates can be formed using principals of the present invention for reinforcing other articles such as industrial belts and that a single ply of the present invention can be used with known or conventional plies to also form new useful reinforced composite structures.

Preferably the cords 14 are comprised of two filaments of finely drawn high tensile steel wire twisted about each other. Preferably the filament diameter is 0.30 mm and its tensile elastic modulus is 190 GPa or greater. The cord has a uniform lay length of 10 to 16 mm and in the preferred embodiment 14 mm.

The cord of the preferred embodiment will be designated as 2×0.30 HT designating a two filament twisted cord having filaments of 0.30 mm diameter of a high tensile steel wire wherein high tensile is steel made with a carbon content by weight of 0.7 to 0.9% and preferably 0.82%.

Figure 1:
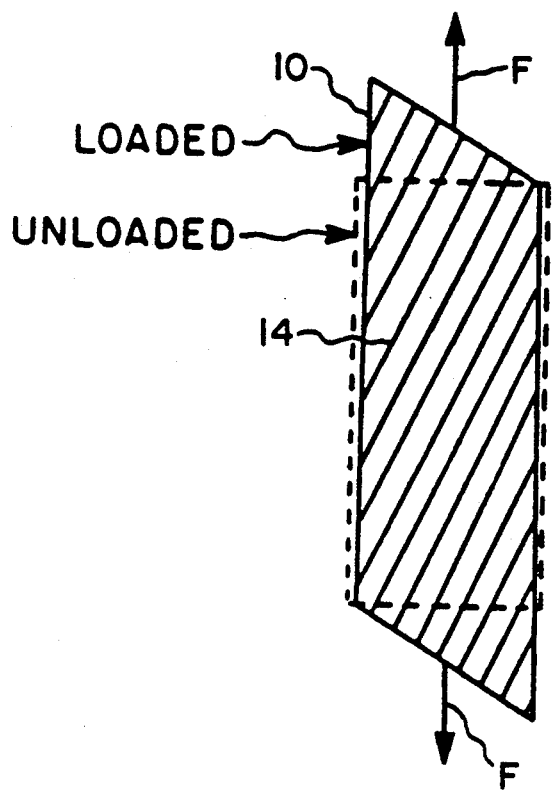
FIG. 1 illustrates schematically a composite of cord and rubber in a loaded and unloaded condition.
Figure 3:
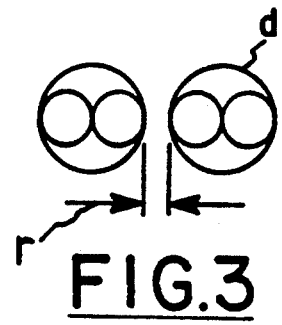
FIGS. 3 and 4 are cross sections through cords in accordance with an embodiment of the present invention at points one half lay length apart from each other in the cords.
Figure 4:
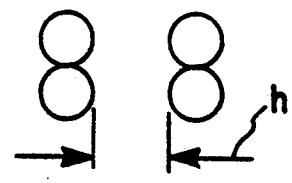

Referring to FIGS. 3 and 4 if a cross section is taken through a ply at right angles to the cords 14 they would appear as illustrated in FIG. 3 wherein d is the diameter of the cord defined by the circle inscribing the two filaments, being 0.60 mm in the preferred embodiment. Conventionally the inscribed diameter of the cord is used to define the rivet illustrated by the space designated in FIG. 3 which is a function of the spacing of the cords laterally across the ply. While this definition of the rivet, being a nominal one, is correct for the cross section of the cord at one point as is illustrated in FIG. 4, the actual rivet h at a point a half a lay length down the length of the cord from that point illustrated in FIG. 3 is quite different. For a tightly twisted two filament cord as illustrated in the preferred embodiment the ratio of the actual to nominal rivet h,r approaches 2 to 1 between the point in FIG. 4 and that in FIG. 3 as nominal rivet approaches zero. This high ratio of actual to nominal rivet over the length of the two filament cord permits closer lateral spacing of the cord in the ply over conventional and larger diameter cords such as 2+7×0.22+1 and 2+2×0.25.

The limit of how many cords can be placed in a rubber body to reinforce it is determined by the minimum rivet allowable for proper adhesion of rubber to cord. For 2+2×0.25 cord this limit is 7.87 ends per centimeter while for 2+7×0.22 wire it is 6.30 ends per centimeter the end count dropping as the diameter of the wire increases as illustrated in Table 1 below.

TABLE 1

| Reinforcement Matrix | Tensile Stress-Strain Properties of 'Belt' Composites | | | |
|---|---|---|---|---|
| | 2 + 7X.22 + 1 Comp. I | 2 + 2X.25 Comp. I | 2 + 2X.25 Comp. II | 2X.30HT Comp. II |
| End Count (ends/cm) | 6.30 | 7.87 | 7.87 | 9.45 |
| Nominal Rivet (mm) | 0.762 | 0.584 | 0.584 | 0.457 |
| Cord diameter (mm) | 0.838 | 0.686 | 0.686 | 0.610 |
| Cord volume content (%) | 17 | 13 | 13 | 11 |
| Load (MPa) | | | | |
| Critical | 16.2 | 16.5 | 16.6 | 19.8 |
| Gross | 54.5 | 58.5 | 57.3 | 58.7 |
| Strain (%) | | | | |
| Critical | — | 10.7 | 11.0 | 10.9 |
| Gross | — | 20.5 | 21.5 | 20.8 |

Table 1 values are based on the numerical average for 4 to 7 specimens wherein the values of cord volume content are calculated from cross sectional areas of reinforced cords, neglecting the space between the filaments. The Table's values are further based on the preferred embodiment illustrated herein of a 2 ply tire belt for radial passenger tires with cords at opposing 23° angles to each other. Table 1 illustrates a substantial improvement in the resistance to belt edge separation initiation load which is the critical load for the composite reinforced by 2×0.30 HT cord. For the 2×0.30 HT cord of the present invention the critical load was 19.8 MPa while for 2+2×0.25 and 2+7×0.22 cords the same load was well below 17 MPa. Note that the smaller diameter of the 2×0.30 HT cord permitted a higher end count of 9.45 ends per centimeter within the limitation of good adhesion. It was further found that the end count for 2×0.30 HT could be raised as high as 11.02 ends per centimeter without loss of required rubber to cord adhesion due to the reduction in rivet.

Initially cords of two twisted filaments of diameters of up to 0.38 mm using conventional tire cord steel were tried which had large enough diameters to give sufficient tensile strength of the cords but were found to fail for lack of fatigue life of the composite. The new reinforcing cords constructed from two high tensile steel wire filaments were found to have an increase in fatigue life of the composite in addition to the necessary tensile strength of the cord as illustrated in Table 2 and filament diameters of less than 0.34 mm were found satisfactory for meeting fatigue requirements.

TABLE 2

Tensile Fatigue Resistance of 'Belt Composites in the Threshold Region

|  | A | B | C |
|---|---|---|---|
| Reinforcement | 2 + 2X.25 | 2 + 2X.25 | 2X.30HT |
| Matrix | Comp. I | Comp. II | Comp. II |
| End count (ends/cm) | 7.87 | 7.87 | 9.45 |
| Maximum Cyclic Load (MPa) (lb/in width) | 16.9 | 16.9 | 16.9 |
| # Cycles to failure | 185,910 | 213,510 178,540 | No damage at 2,000,000 cycles |

Note: The frequency of 10 cycles/sec is used.

Further for the same diameter and construction reinforcing cords made of high tensile steel wire exhibited lower weight for equivalent modulus values compared with those made of conventional steel wire for tire cord of a lower carbon content. For example, the weight of 2+2×0.25 high tensile cord is 4% lower than that of 2+2×0.25 cord of conventional steel for tire cord.

For a given wire system two twisted filaments provide the lightest and simplest cord construction which has the flexibility of a multi filament cord. It has been determined that the use of a single filament of sufficient diameter to provide the necessary tensile strength for a tire belt reinforcement lacks the flexibility to give the necessary fatigue life required for the belt composite.

It was experimentally observed that when the filament diameter of the preferred embodiment cord, two filament cord, exceeded 0.34 mm Tabor bending stiffness of the cord departs sharply from that of conventional wire reinforcement with a similar cord diameter.

The above results suggest that a new metallic cord constructed from two high tensile steel wire filaments with individual filament diameters of less than 0.34 mm would be the preferred choice for belt reinforcement in terms of bending stiffness and weight of the cord. More particularly, 2×0.30 HT cord becomes a direct substitute for 4×0.25 or 2+2×0.25 conventional steel tire cord. While the 2×0.30 HT cord is a direct substitute it should be noted that it has a lower weight and smaller cross sectional area compared with 2×0.30 conventional steel cord and 2+2×0.25 cord respectively (see Table 3).

TABLE 3

Relative Weight of Steel Cord Reinforcement

| Construction | Relative Weight |
|---|---|
| 2x.30HT | 88 |

TABLE 3-continued

Relative Weight of Steel Cord Reinforcement

| Construction | Relative Weight |
|---|---|
| 2x.32HT | 90 |
| 4x.25 | 94 |
| 2 + 2x.25HT | 96 |
| 2 + 2x.25 | 100 |
| 2 + 2x.28HT | 100 |
| 2 + 2x.28 | 104 |
| 2 + 7x.22 + 1 | 100 |

Note: The calculation of relative weight is based on the weight of wire reinforcement and 1 mm thick rubber insulation on the top and bottom of the wire.

It was also found that compared to conventional construction of similar cord diameter for example 2+2×0.25 the cut ends of two filament cord such as 2×0.30 HT of the present invention are found to be more likely to separate where they are cut often referred to as flare (see Table 4). This increased tendency of filament separation at the cut ends of the cords can result in an increased constraint over a local region of the rubber matrix at a belt edge.

TABLE 4

Flare Length (mm) at 1 min after Cutting

| 2 + 2X.25 (14 mm Lay Length) | | 2X.30HT (14 mm Lay Length) | |
|---|---|---|---|
| 8 | 0 | 17 | 10 |
| 0 | 5 | 5 | 5 |
| 8 | 0 | 20 | 3 |
| 8 | 5 | 5 | 6 |
| 7 | 0 | 14 | 11 |
| 10 | 5 | 5 | 6 |
| 5 | 10 | 10 | 7 |
| 2 | 6 | 5 | 6 |
| 2 | 7 | 3 | 4 |
| 8 | 7 | 8 | 5 |
| Ave | 5 | Ave | 8 |

Some of the more unexpected results of the belt package of the preferred embodiment include a greater belt stiffness of 2 to 6% over the comparable 2+2×0.25 cord reinforced belt package wherein usually a smaller diameter cord in a belt of lighter weight would give less stiffness in a tire belt reinforcement. Initial experimental data also indicates that the belt of the preferred embodiment also gives better ride characteristics of the tire while at the same time improving handling characteristics of the tire. Ride is a quality associated with hoop stiffness and handling is associated with the belt stiffness and while a softer ride usually is obtained at the sacrifice of better handling, i.e., a stiffer belt, in the present belt package both a softer ride and improved handling were achieved.

Also it is observed that even at the preferred belt embodiment end count of 9.45 ends per centimeter in the smaller diameter cord there is a greater plunger energy achieved over a comparable 2+2×0.25 cord reinforced belt which is a measure of resistance to penetration of a tire by foreign objects.

While the preferred embodiment has been described herein as a two ply belt, the present invention would also apply to belts for tires having more than two plies as well as to other articles of multiple plies. As pointed out above, even a single ply in accordance with the present invention would be useful with conventional plies and further a single ply could well be useful in tires or other articles as a single ply reinforcement. The reinforcement of this invention is not limited to the particular embodiment illustrated nor to necessarily the preferred two filament embodiment, rather multi filament cords of a smaller diameter using high tensile steel filaments having the characteristic high tensile modulus coupled with the necessary flexibility for fatigue life and the stiffness for lateral and planar support would also fall within the scope of this invention.

In accordance with the provisions of the patent statutes, the principal and mode of operation of the reinforced composite structure have been explained and what is considered to represent its best embodiment has been illustrated and described. It should, however, be understood that the invention may be practiced otherwise than as specifically illustrated and described without departing from its spirit or scope.

What is claimed is:

1. A pneumatic radial tire having at least one reinforced ply of elastomer, the reinforced ply comprising a plurality of cords, each cord having two high tensile steel filaments of circular cross-section twisted together, each filament having a diameter of about 0.30 millimeters and having a carbon content by weight of about 0.8% to about 0.9%.

2. A pneumatic radial tire in accordance with claim 1 in which each filament has a carbon content by weight of about 0.82%.

3. A pneumatic radial tire in accordance with claim 2, in which each filament has a diameter of 0.30 millimeters.

4. A pneumatic radial tire in accordance with claim 1, in which each filament has a diameter of 0.30 millimeters.

5. A pneumatic radial tire comprising a radial carcass ply, and at least one reinforced ply of elastomer in a belt circumferentially encompassing the carcass for reinforcing the tire, the reinforced belt ply including a plurality of reinforcement cords spaced laterally to the direction of reinforcement, each cord having two twisted steel circular filaments, each filament made from steel with a carbon content by weight of about 0.8% to about 0.9% and having a diameter of about 0.30 millimeters.

6. A tire comprising a radial carcass ply, and at least one reinforced ply of elastomer in a belt circumferentially encompassing the carcass for reinforcing the tire, the reinforced belt ply including a plurality of reinforcement cords spaced laterally to the direction of reinforcement, each cord having two twisted steel circular filaments, each filament made steel with a carbon content by weight of from about 0.8% to about 0.9% and having a diameter of 0.25 to 0.35 millimeters.

7. A tire in accordance with claim 6 in which the reinforced ply has at least about 9.45 cords per centimeter.

8. A tire in accordance with claims 6 in which the reinforced ply has up to about 11.02 cords per centimeter.

9. A tire in accordance with claim 6 in which the reinforced ply has from 8.66 to 11.02 cords per centimeter.

10. A tire in accordance with claim 6 in which the cords have an average flare length of 8 millimeters one minute after cutting the ends thereof.

11. A pneumatic radial tire comprising a radial carcass and a belt circumferentially encompassing the carcass to reinforce the tire, the belt having two layers of cord each cord made of two twisted single 0.30 millimeter diameter filaments said filaments made from steel with a carbon content by weight of 0.82%, each cord layer having 9.45 cord per centimeter spaced in a direction lateral to the direction of reinforcement of the belt and oriented at angles of about 23° to the direction of movement of the tire and opposed to each other.

* * * * *